Figure 1:
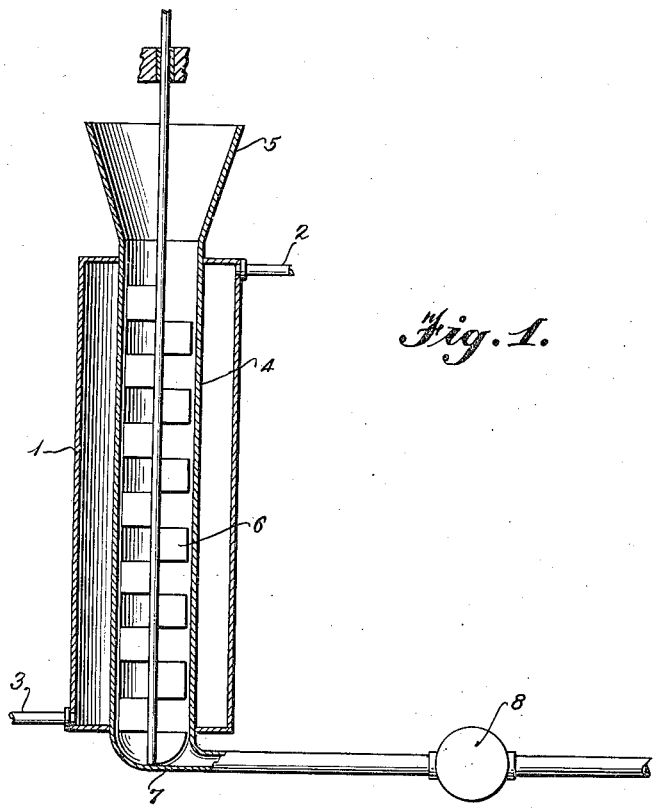

April 5, 1949.    A. VAN HALEWIJN    2,466,649
DISSOLVING APPARATUS FOR THE PREPARATION
OF CELLULOSE SOLUTIONS
Filed Dec. 4, 1946

Inventor
Arie van Halewijn

By Albin F. Knight
Attorney

Patented Apr. 5, 1949

2,466,649

UNITED STATES PATENT OFFICE 2,466,649

DISSOLVING APPARATUS FOR THE PREPARATION OF CELLULOSE SOLUTIONS

Arie van Halewijn, Arnhem, Netherlands, assignor to American Enka Corporation, Enka, N. C., a corporation of Delaware Application December 4, 1946, Serial No. 713,898
In Germany October 18, 1941

Section 1, Public Law 690, August 8, 1946
Patent expires October 18, 1961

1 Claim. (Cl. 23—267)

This invention relates to improvements in methods of preparing a cellulose spinning solution.

In my prior Patent No. 2,289,085, there is described and claimed a method of preparing a cellulose spinning solution wherein previously purified cellulosic material such as soda cellulose, sulphite cellulose, cotton linters, etc., is subjected to prolonged heating at temperatures from 115° to 140° C., thereafter is cooled and comminuted or pulverized and introduced into an alkali metal salt solution of the class consisting of zincate and stannate solutions where it is held at temperatures of 0° C. or lower until dissolved. The solution thus prepared is filtered if necessary and aged to prepare it for spinning into filaments through a coagulating bath.

Alternatively, my earlier patent discloses that in lieu of the heat-treating step as set forth above, the cellulose may be chemically treated in order to prepare it for dissolution in the alkali metal salt solution. One specific method which is described as producing particularly satisfactory results involves immersing the cellulose in dilute soda lye solution, thereafter pressing out the cellulose, comminuting it and subjecting it to a ripening process until satisfactorily decomposed. If desired the thus prepared alkali containing cellulose may be heat-treated prior to its introduction into the alkali metal salt solution. Thereafter the chemically prepared cellulose is subjected to the same treatment as the heat-treated cellulose in preparing the spinning solution.

My prior patent sets forth an additional method of treatment of the cellulose material in an alkali metal salt solution which comprises allowing the pretreated cellulose and solvent to stand first at room temperature for about ½ hour whereby the cellulose, particularly when the mixture is stirred, tends to disintegrate into individual fibers. Thereafter the mixture is rapidly cooled to for example —8° C. at which point stirring is begun and continued for a time, for example about 10 minutes, until the solution is freed from swollen fibers. At this point the solution is heated rapidly to room temperature and is then ready for spinning.

While the above methods produce generally satisfactory results, difficulties have been encountered which render operations subsequent to the cold-treatment inefficient and to a certain extent impractical.

Specifically, it has been found undesirable to expose the cellulose alkali metal salt solution to low temperatures for long periods of time because gelatination of the solution occurs which renders further working difficult.

Additionally, it has been found extremely difficult to cool a large amount of cellulose uniformly in the salt solution; a part of the cellulose cools rapidly and goes into solution, whereas the portion not cooled so rapidly to the required temperature does not dissolve rapidly enough. Therefore, in bringing the entire mass to a uniform temperature, the portion which cooled rapidly and dissolved is necessarily held in solution at the desired temperature while the slow cooling portion is brought into solution. This condition results in gelatination of the earlier cooled portion, thus rendering the entire batch, which dissolves only gradually, practically unusable.

The present application therefore offers improvements to the process set forth in my prior patent and is specifically directed to remedying the foregoing undesirable conditions encountered in large scale operations.

I have discovered that by controlling the time of exposure of the mixture of cellulose and salt solution to the cold during the dissolving step, while at the same time exposing the said mixture in very thin layers, the cellulose cools uniformly, and thus dissolves uniformly, without gelatination.

For carrying out my improved method, I provide an apparatus which is illustrated somewhat schematically in the appended drawing, wherein the mixture is cooled and at the same time is agitated to effect dissolution of the cellulose. In Figure 1 of the drawing, 1 denotes a cooling jacket having inlet and outlet ports 2 and 3 respectively through which a cooling liquid is circulated about inner tube 4. Tube 4 is of small diameter and at its upper end is provided with a funnel 5 through which the material to be cooled is introduced. Within the tube 4 is a combined agitator and conveyor 6 which serves to mix the cellulose and salt solution and to cause the mixture to have uniform time and surface contact with the cooled surface of tube 4 as the mixture is moved therethrough. If desired, funnel 5 may be provided with a propeller for introducing the mass into the tube.

Leading away from the lower end of tube 4 is a discharge tube 7 which is connected to pump 8 which pump serves to move the solution to aging reservoirs not shown in the drawing.

Figure 2:
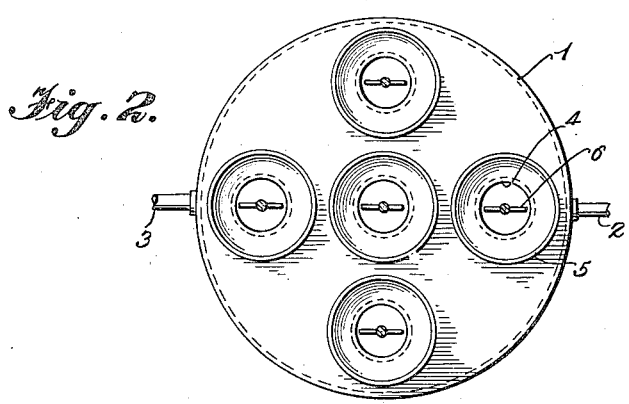

It has been found desirable to provide a number of such devices when processing a large quantity of material. In so doing, however, a plurality of tubes with agitator-conveyor members are provided with a common cooling jacket, the tubes being connected to a common pump. Figure 2 of the drawings shows a top view of this form of the apparatus.

Depending upon the temperature to which the mass is desired to be exposed, I have found that it is necessary to limit the time of exposure. For example, I taught in my prior Patent No. 2,289,085, that it is desirable to dissolve the mixture at about −8° C. because dissolution is thereby rapidly promoted and further that the mass should be stirred at this temperature for about 10 minutes. I now find however that the time of said cold exposure of the mass in the apparatus described above must be limited to 10 minutes, otherwise gelatination occurs. On the other hand, I find that the mass may be held under cold treatment for as long as 45 minutes without gelatination taking place if the temperature in the cooling zone is not allowed to drop below −4° C. Therefore a definite relation exists between the time and temperature involved because as the temperature is lowered, the time of exposure must be considerably decreased.

In practice the salt solution containing cellulosic material treated by either of the methods set forth in my prior Patent No. 2,289,085 is introduced into the funnel member 5 from which it passes into the cooling tube 4 where it is cooled to preferably about −8° C. The flow of the material through tube 4 is so regulated by pump 8 and conveyor 6 as to allow all of it to be cooled to the desired temperature; and to remain at that temperature for a time period not exceeding 10 minutes. Thereupon, the then dissolved material passes into the discharge outlet and into pump 8 which discharges it into a receiving reservoir where it is brought to room temperature as rapidly as possible and is ready for spinning in any desired manner.

What is claimed is:

An apparatus for dissolving cellulose in a salt solution of the class consisting of alkali metal zincate and stannate solutions, comprising a vertically disposed shell having an inlet port and an outlet port for the passage of cooling material therethrough, a tube of small diameter passing vertically through said shell said tube being open at each of its ends, an agitator shaft passing centrally through said tube, a pair of groups of agitator vanes attached to said shaft, the vanes of one group lying in a radius 180° away from the vanes of the other group, the component vanes of each group being axially spaced and being staggered with respect to the vanes of the other group in such a way that for the entire length of the group of vanes there is a vane in each horizontal plane, said vanes terminating in closely spaced relation to the inner walls of the tube, and a pump of the positive displacement type attached at the lower end of said tube to effect movement of the material in the tube at a predetermined uniform speed.

ARIE van HALEWIJN.

REFERENCES CITED

The following references are of record in the file of this patent:

UNITED STATES PATENTS

| Number | Name | Date |
|---|---|---|
| 877,245 | Sherry | Jan. 21, 1908 |
| 1,671,586 | Horwitz | May 29, 1928 |
| 1,722,435 | Leiboff | July 30, 1929 |
| 1,854,731 | Beran | Apr. 19, 1932 |
| 1,961,903 | McKee | June 5, 1934 |
| 2,057,019 | Evans | Oct. 13, 1936 |
| 2,289,085 | Van Halewijn | July 7, 1942 |
| 2,325,320 | Holuba | July 27, 1943 |
| 2,419,341 | Edelstein | Apr. 22, 1947 |